(12) United States Patent
Yoshida (10) Patent No.: US 10,371,279 B2
(45) Date of Patent: Aug. 6, 2019

(54) ACTUATOR (71) Applicant: SUMITOMO HEAVY INDUSTRIES, LTD., Tokyo (JP)

(72) Inventor: Tatsuya Yoshida, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 15/713,159

(22) Filed: Sep. 22, 2017

(65) Prior Publication Data
US 2018/0010709 A1 Jan. 11, 2018

Related U.S. Application Data (63) Continuation of application No. PCT/JP2016/057070, filed on Mar. 8, 2016.

(30) Foreign Application Priority Data

Mar. 31, 2015 (JP) .................. 2015-072054

(51) Int. Cl.
*F16C 29/02* (2006.01)
*F16K 31/12* (2006.01)
*F16C 32/06* (2006.01)
*F15B 15/24* (2006.01)
*F15B 21/044* (2019.01)

(52) U.S. Cl.
CPC .............. *F16K 31/12* (2013.01); *F15B 15/24* (2013.01); *F15B 21/044* (2013.01); *F16C 29/02* (2013.01); *F16C 32/06* (2013.01)

(58) Field of Classification Search
CPC ...................................................... F16C 29/025
See application file for complete search history.

(56) References Cited

U.S. PATENT DOCUMENTS

| | | | | |
|---|---|---|---|---|
| 6,328,473 | B1 * | 12/2001 | Tokushima ........... | F16C 29/025 384/12 |
| 6,419,394 | B1 * | 7/2002 | Kashchenevsky .... | F16C 29/025 384/12 |
| 7,189,002 | B2 * | 3/2007 | Shinohara ............. | F16C 29/025 384/12 |
| 7,284,906 | B2 * | 10/2007 | Emoto .................. | F16C 29/025 384/12 |
| 8,530,857 | B2 * | 9/2013 | Ooae ..................... | F16C 29/025 250/440.11 |

(Continued)

FOREIGN PATENT DOCUMENTS

| | | |
|---|---|---|
| JP | S64-041727 U | 3/1989 |
| JP | H11-190306 A | 7/1999 |

(Continued)

OTHER PUBLICATIONS

Search Report issued in European Application No. 16772113.3, dated Oct. 30, 2018.

*Primary Examiner* — Thomas R Hannon
(74) *Attorney, Agent, or Firm* — Michael Best & Friedrich LLP (57) ABSTRACT

An actuator includes a guide that extends in one direction and a slider that is movable in an axial direction with respect to the guide. Either the guide or the slider has a recessed cross-section, and the slider is guided by the guide while the other of the guide and the slider is restrained by three surfaces constituting the recessed cross-section.

12 Claims, 6 Drawing Sheets (56) References Cited

U.S. PATENT DOCUMENTS

2002/0085192 A1* 7/2002 Miura ................ B82Y 10/00
    355/73
2002/0118897 A1* 8/2002 Sakino .............. F16C 29/025
    384/12

FOREIGN PATENT DOCUMENTS

| JP | 2002-257138 A | 9/2002 |
|----|---------------|--------|
| JP | 4443778 B2 | 3/2010 |
| WO | WO-2004/032212 A1 | 4/2004 |

* cited by examiner

ACTUATOR

RELATED APPLICATIONS

Priority is claimed to Japanese Patent Application No. 2015-072054, filed Mar. 31, 2015, and International Patent Application No. PCT/JP2016/057070, the entire content of each of which is incorporated herein by reference.

BACKGROUND

Technical Field

Certain embodiments of the present invention relate to an actuator in which a slider is movable while being guided by a guide.

Description of Related Art

Actuators used in a vacuum environment are required not to contaminate the inside of a vacuum chamber. A gas pressure actuator is known as such an actuator (for example, the related art). The gas pressure actuator is configured such that the slider can be moved smoothly with respect to a guide shaft by ejecting compression gas from air pad provided within the slider. The gas pressure actuator has various advantages, such as no generation of microscopic dust from lubricating oil or a sliding surface and no generation of heat from the actuator, like actuators using a rolling bearing and a linear guide.

SUMMARY

According to an embodiment of the present invention, there is provided an actuator of an aspect including a guide that extends in one direction; and a slider that is movable in an axial direction with respect to the guide. At least one surface of the guide is open. The slider has an air pad that ejects compression gas, and an air servo chamber for driving the slider, and is configured so as to be floated with respect to the guide and guided by the guide.

The expression "one surface is open" includes a case where one entire surface is open and also a case where a portion of one surface is open.

Additionally, according to another embodiment of the present invention, there is provided an actuator including a guide that extends in one direction; and a slider that is movable in an axial direction with respect to the guide. At least one surface of the guide is open. The slider has an air pad that ejects compression gas, and an exhaust groove that discharges the compressed air ejected from the air pad, and is configured so as to be floated with respect to the guide and guided by the guide. The exhaust groove includes a portion that extends in the axial direction.

Additionally, according to still another embodiment of the present invention, there is provided an actuator including a guide that extends in one direction; and a slider that is movable in an axial direction with respect to the guide. Either the guide or the slider has a recessed cross-section, and the slider is guided by the guide while the other of the guide and the slider is restrained by three surfaces that constitute the recessed cross-section.

DETAILED DESCRIPTION

In the related-art known gas pressure actuator, a slider formed in an oblong tubular shape has a structure in which a guide shaft similarly having a rectangular cross-section is restrained by four surfaces. In the actuator having such a structure several manufacturing problems such that the manufacturing cost of the guide shaft is high and the assembly and adjustment of the slider with respect to the guide shaft is complicated are present.

It is desirable to provide a simple structure of an actuator in which a slider is movable while being guided by a guide.

The guide may have a recessed cross-section, and the slider may be configured to be floated with respect to the guide and guided by the guide while being restrained by three surfaces that constitute the recessed cross-section.

The guide may have a polygonal cross-section, and the slider may be configured to be floated with respect to the guide and guided by the guide while being restrained by one surface of a plurality of surfaces that constitute the polygonal cross-section.

According to these aspects, since the slider has a structure in which one surface of the guide is open compared to the actuator of the related-art structure in which the guide shaft is restrained by the four surfaces, the structure of the guide and the slider can be simplified.

A magnet preloading mechanism that applies a downward force resulting from magnetism to the slider may be provided between the slider and the guide. According to this, the bearing rigidity of the actuator can be secured.

The guide may have a recessed cross-section, and the slider may be configured to be floated with respect to the guide and guided by the guide while being restrained by three surfaces that constitute the recessed cross-section.

The guide may have a polygonal cross-section, and the slider may be configured to be floated with respect to the guide and guided by the guide while being restrained by one surface of a plurality of surfaces that constitute the polygonal cross-section.

According to these aspects, since the slider has a structure in which the surfaces of the guide are open compared to the actuator of the related-art structure in which the guide shaft is restrained by the four surfaces, the structure of the guide and the slider can be simplified.

A magnet preloading mechanism that applies a downward force resulting from magnetism to the slider may be provided between the slider and the guide. According to this, the bearing rigidity of the actuator can be secured.

According to the aspect, since the slider has a structure in which one surface of the guide or the slider is open compared to the actuator of the related-art structure in which the guide shaft is restrained by the four surfaces, the structure of the guide and the slider can be simplified.

The slider may have an air pad that ejects compression gas, and may be configured to be floated with respect to the guide and guided by the guide. According to this, even in the case of the gas pressure actuator, the structure of the guide and the slider can be simplified.

The slider may further have an exhaust groove that discharges the compressed air ejected from the air pad and the exhaust groove may include a portion that extends in the axial direction. According to this, the gas pressure actuator of the structure in which one surface of the guide or the slider is open can be used even in a vacuum environment.

The slider may have an air servo chamber that extends in the axial direction. The guide may have a partition wall that enters the air servo chamber to partition the air servo chamber into two. The slider may supply the compression gas to one partition of the two partitions of the air servo chamber and discharges the compression gas from the other partition, thereby moving in the axial direction with respect to the guide.

A magnet preloading mechanism that applies a downward force resulting from magnetism to the slider may be provided between the slider and the guide. According to this, the bearing rigidity of the actuator can be secured.

In addition, arbitrary combinations of the above elements and those obtained by substituting the elements or expressions of the invention with each other among devices, methods, systems, and the like are also effective as aspects of the inventions.

According to the invention, the actuator in which the slider is movable while being guided by the guide can be made to have a simple structure.

Hereinafter, the same or equivalent constituent elements or members illustrated in the respective drawings will be denoted by the same reference signs, and redundant description will be appropriately omitted. Additionally, the dimensions of the members in the respective drawings are appropriately enlarged and reduced in order to make the invention easily understood. Additionally, in the respective drawings, some of the members that are not important in explaining the embodiment will be omitted and illustrated.

Figure 1:
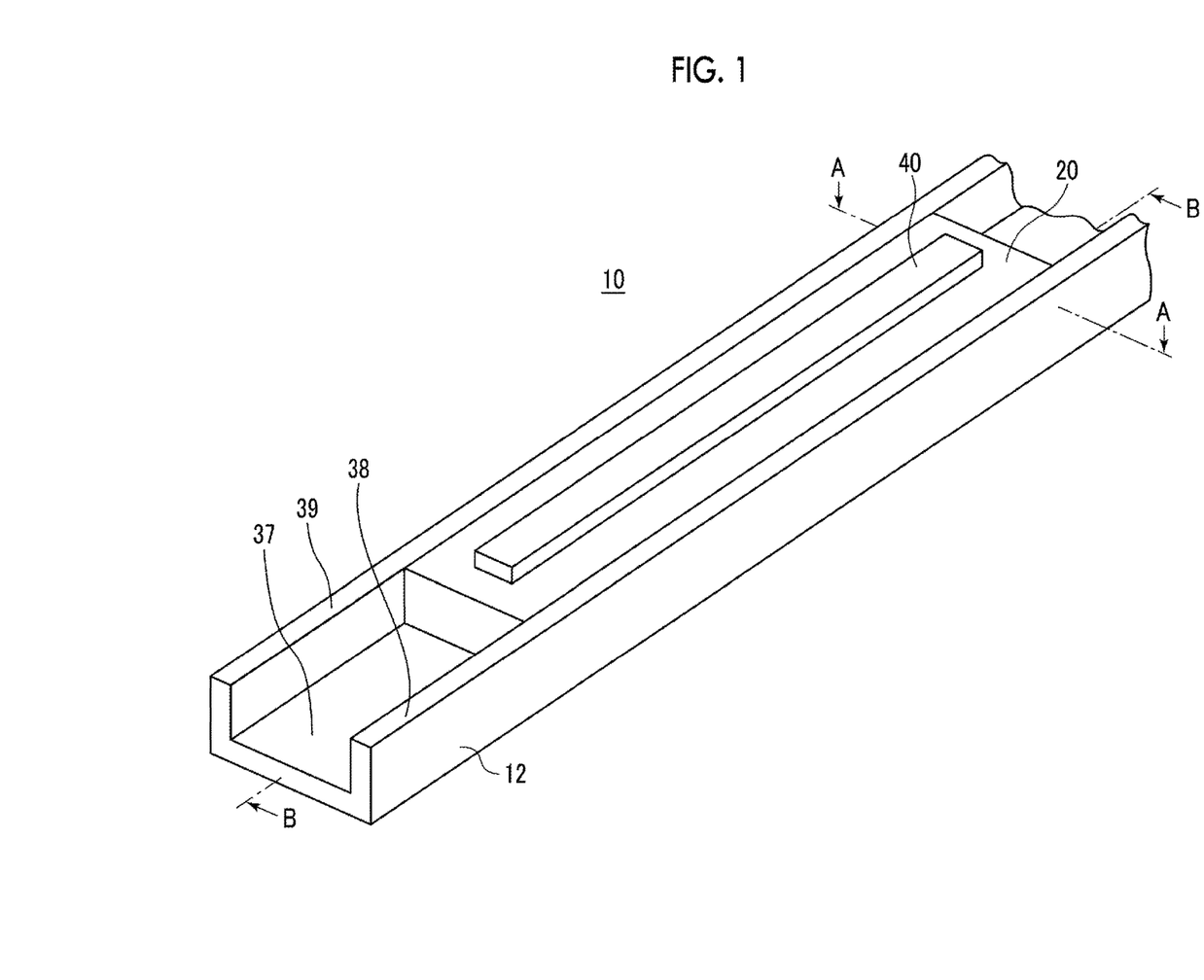
FIG. 1 is a schematic perspective view of a gas pressure actuator related to one embodiment of the invention.

FIG. 1 is a schematic perspective view of a gas pressure actuator 10 related to one embodiment of the invention. The gas pressure actuator 10 is constituted of a guide 12 that extends in one direction and formed to have a recessed cross-section, and a slider 20 that is movable in an axial direction along the guide 12 while being guided by the guide 12 and has a rectangular parallelepiped shape. The guide 12 has a bottom wall 37, a first side wall 38, and a second side wall 39, and both ends and an intermediate part of the bottom wall 37 are supported by legs that are not illustrated.

The slider 20 has a lid 40. The lid 40 closes an opening of an air servo chamber 28 (to be described below) formed in the slider 20. In addition, the lid 40 becomes unnecessary in a case where the air servo chamber 28 is formed so as not to pass through the slider 20. The slider 20 is housed so as to have a slight gap inside a recessed guide 12. As will be described below in detail, the slider 20 is smoothly movable along the guide 12 by ejecting compression gas (for example, air) from an air pad provided in the slider 20.

The gas pressure actuator 10 is used for driving a movable stage, for example in a device that operates within a vacuum chamber of an electron beam exposure system or the like. In a case where the gas pressure actuator is used together with the electron beam exposure system, there is a concern that an electron beam trajectory is affected when the gas pressure actuator is a magnetic body. Therefore, the guide 12, the legs, and the slider 20 are formed of, a non-magnetic-material material, for example, ceramics.

Since the gas pressure actuator 10 has no generation of microscopic dust from lubricating oil or a sliding surface, for example, as compared to a slider in which a rolling bearing or a linear guide is used, the gas pressure actuator 10 is suitable for, for example, an electron beam exposure system used in a vacuum environment.

Figure 2:
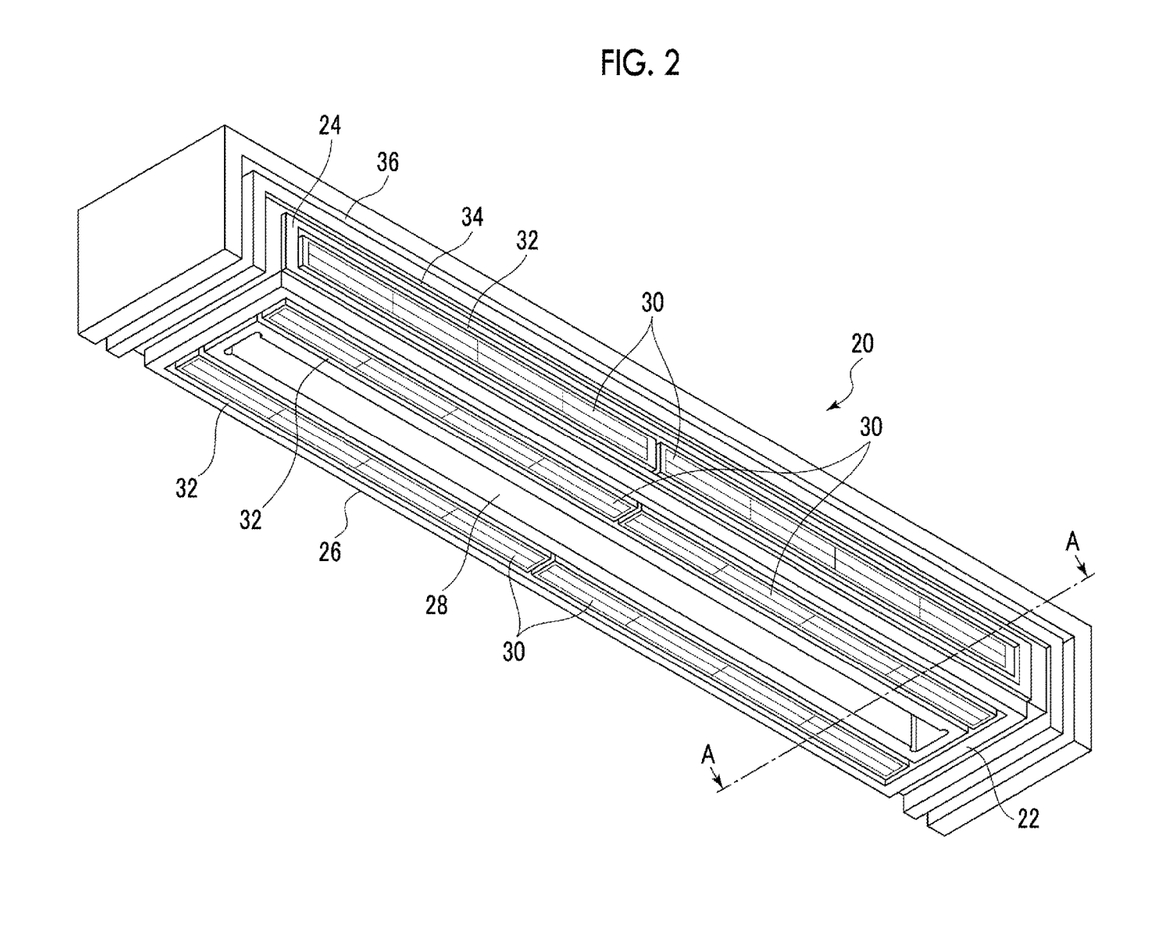
FIG. 2 is a perspective view of a slider that constitutes the gas pressure actuator.
Figure 3:
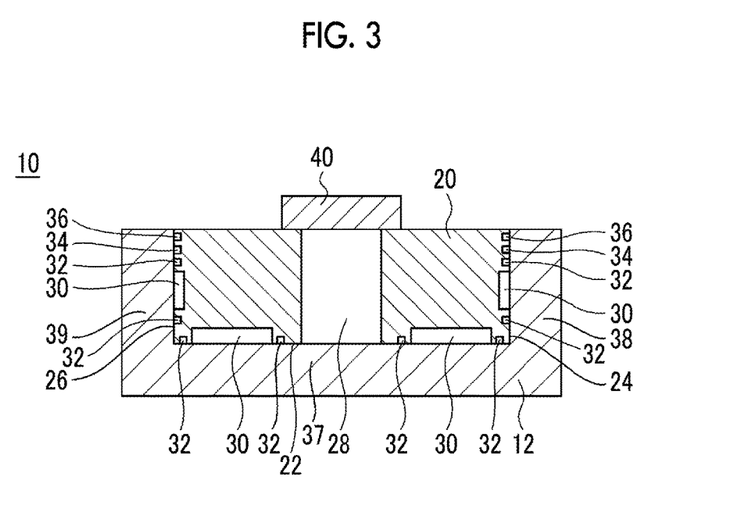
FIG. 3 is an axial sectional view of the gas pressure actuator taken along line A-A in FIGS. 1 and 2.

FIG. 2 is a perspective view of the slider 20 as seen from below, and FIG. 3 is an axial sectional view of the gas pressure actuator 10 taken along line A-A in FIGS. 1 and 2. A plurality of air pads 30 are formed on surfaces, which face the recessed guide 12, among surfaces of the slider 20 that constitute the substantially rectangular parallelepiped shape, that is, a bottom surface 22, a first side surface 24, and a second side surface 26. The air pads 30 eject a high-pressure gas supplied from an air supply system (not shown), and form a high-pressure gas layer in a minute gap between the air pads 30 and the guide 12, thereby floating the slider 20 from the guide 12. The air servo chamber 28 for driving the slider 20 is formed at a central part of the slider 20.

Exhaust grooves 32, 34, and 36 for differential exhaust are formed at edge portions of the bottom surface 22, the first side surface 24, and the second side surface 26 of the slider 20 so as to surround the plurality of air pads 30. Hence, the exhaust grooves 32, 34, and 36 all include a portion that extends in an axial direction of the slider 20. The exhaust groove 32 is open to the atmosphere. In addition, the exhaust groove 32 may be connected to an exhaust pump (not illustrated). The exhaust grooves 34 and 36 are connected to the exhaust pump (not illustrated) for setting the pressure in the exhaust grooves to a low vacuum-pressure level and a middle vacuum-pressure level, respectively, and exhaust a compression gas, which is supplied from the air pads 30 and the air servo chamber 28 of the slider 20 to an internal space, to the outside. Accordingly, the gas pressure actuator can be made available even in a vacuum environment by preventing the compression gas from leaking out from a gap between the guide 12 and the slider 20. In addition, in a case where the gas pressure actuator 10 is available in an atmospheric pressure environment, it is not necessary to provide such exhaust grooves 32, 34, and 36.

In a case where the guide 12 is made to have a recessed shape, the guide 12 is likely to be deformed such that the spacing between an upper end of the first side wall 38 and an upper end of the second side wall 39 increases depending on the load capability of the air pads 30 disposed on the side surfaces of the slider 20 (that is, such that an upper side thereof widens). Accordingly, there is a concern that it may be impossible to secure desired bearing rigidity. Thus, it is preferable that the air pads 30 of the side surfaces of the slider 20 are disposed as close to the bottom surface 22 side as possible.

Figure 4:
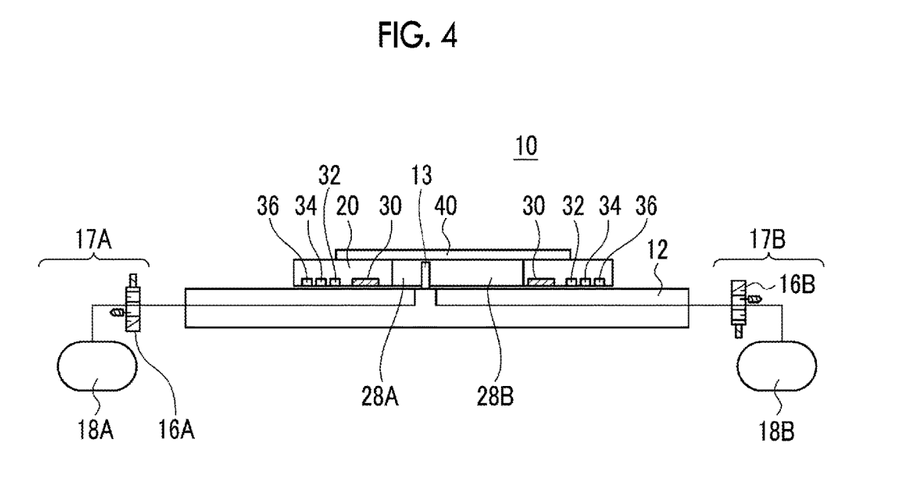
FIG. 4 is a sectional view of the gas pressure actuator, taken along line B-B in FIG. 1, illustrating an operation principle of the gas pressure actuator.

FIG. 4 is a sectional view of the gas pressure actuator, taken along line B-B in FIG. 1, illustrating an operation principle of the gas pressure actuator 10. In addition, in FIG. 4, the gap between the guide 12 and the slider 20 and a gap between a partition wall 13 and the air servo chamber 28 are drawn in an exaggerated manner. In practice, for example, these gaps are about several microns. As illustrated in the drawings, the partition wall 13 that partitions the air servo chamber 28 of the slider 20 into two servo chambers 28A and 28B with respect to the axial direction is fixed to the guide 12. The air supply systems 17A and 17B for enabling compression gas to enter and leave the respective servo chambers are connected to the two servo chambers 28A and 28B, respectively. The air supply systems 17A and 17B include servo valves 16A and 16B and compression gas supply sources 18A and 18B, respectively.

If compressed air is supplied to the air pads 30, the slider 20 floats slightly with respect to the guide 12. Here, for example, if the compressed air is supplied to the servo chamber 28A and the compressed air is discharged from the servo chamber 28B, the partition wall 13 acts as a piston and the slider 20 move leftward in the drawing. In this way, the slider 20 can be moved to an arbitrary position with respect to the guide 12 by controlling the opening degrees of the servo valves 16A and 16B.

As described above, according to the present embodiment, a structure in which the substantially rectangular parallelepiped-shaped slider slides inside the guide having the recessed cross-section is adopted instead of a slider that restrains four surfaces of the guide. In this structure, since it is possible to support the guide not only at those both ends but in a plurality of places, it is easy to secure the deflection rigidity of the guide, and the cross-sectional area of the guide can be made small as compared to a guide shaft having a square cross-section. Hence, reduction in size of the guide and cost reduction are realized. Additionally, since the slider can be made to have a flat structure, the installation height of the gas pressure actuator can be suppressed. Additionally, since it is not necessary to form the slider in a tubular shape, assembly and adjustment of the slider with respect to the guide can be simplified. Moreover, since the slider and the guide can be manufactured as an integral structure, respectively, the number of parts can be reduced.

Figure 5:
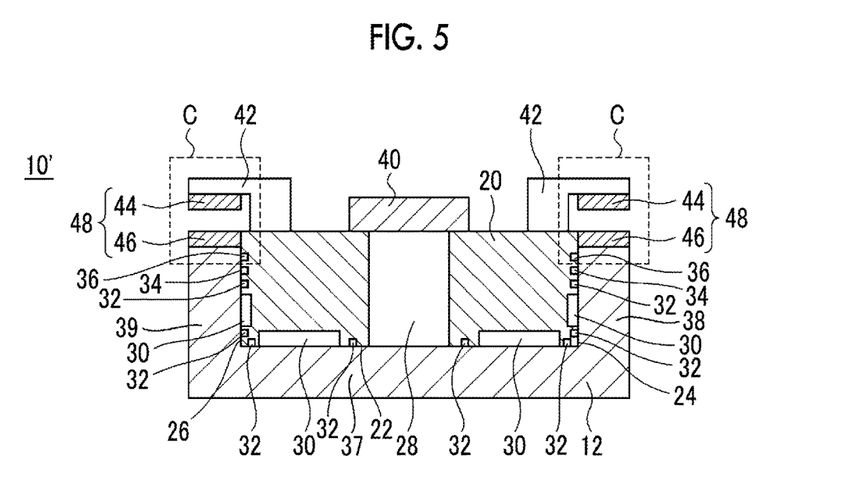
FIG. 5 is an axial sectional view of a gas pressure actuator related to a modification example.

In order to strengthen the bearing rigidity of the gas pressure actuator, a magnet preloading mechanism may be provided. FIG. 5 is an axial sectional view of a gas pressure actuator 10' related to such a modification example. Since members appearing in FIG. 3 among members denoted by reference signs in FIG. 5 have the same configuration, the description thereof will be omitted.

The magnet preloading mechanism 48 applies a downward force to the slider 20 with an attractive force from a magnet.

The slider 20 is provided with an L-shaped supporting member 42 that extends toward both side walls of the guide 12 from an upper surface of the slider 20. A magnet 44 is installed on a lower surface of the supporting member 42 and a soft magnetic material 46 is installed on an upper part of the first side wall 38 and an upper part of the second side wall 39 in the guide 12 so as to attract each other. By configuring the invention in this way, the bearing rigidity of the gas pressure actuator can be enhanced.

In a case where the gas pressure actuator 10 is used with the electron beam exposure system, there is a concern that a leaked magnetic field from the magnet 44 may affect the electron beam trajectory. Thus, it is preferable to perform magnetic shielding to the peripheries of the magnet 44 and the soft magnetic material 46 (places illustrated by dotted lines C in FIG. 5) to suppress the leaked magnetic field.

Figure 6:
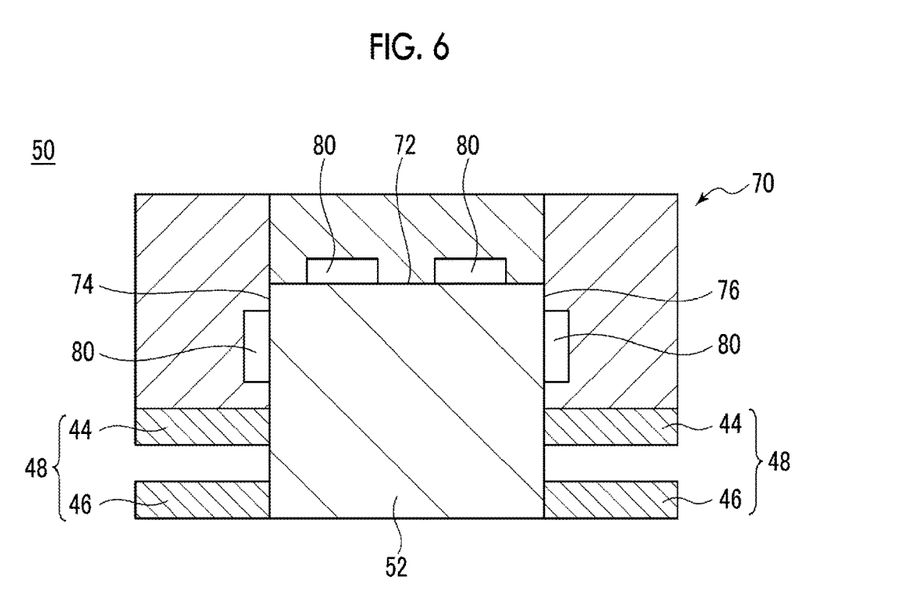
FIG. 6 is an axial sectional view of a gas pressure actuator related to another modification example.

Although a case where the guide 12 has the recessed cross-section and the slider 20 has the substantially rectangular parallelepiped shape has been described above, the shapes of both may be replaced. FIG. 6 is an axial sectional view of a gas pressure actuator 50 related to such a modification example.

In FIG. 6, a guide 52 has a square cross-section and a slider 70 has a recessed cross-section. A plurality of air pads 80 are formed on surfaces, which face the guide 52, among inner surfaces of the slider 70, that is, an upper surface 72, a side surface 74, and a side surface 76. The air pads 80 eject a high-pressure gas supplied from the air supply system (not shown), and form a high-pressure gas layer in a minute gap between the air pads 80 and the guide 52, thereby floating the slider 70 from the guide 52. An air servo chamber (not illustrated) for driving the slider 70 is formed at a central part of the slider 70.

Although not illustrated, exhaust grooves for differential exhaust are formed at edge portions of the upper surface 72, the side surface 74, and the side surface 76 of the slider 70 so as to surround the plurality of air pads 80. The exhaust grooves are connected to the exhaust pump (not illustrated), and exhaust compression gas, which is supplied from the air pads 80 and the air servo chamber of the slider 70 to the internal space, to the outside. Accordingly, the gas pressure actuator can be made available even in a vacuum environment by preventing the compression gas from leaking out from a gap between the guide 52 and the slider 70. In addition, in a case where the gas pressure actuator 50 is available in an atmospheric pressure environment, it is not necessary to provide such exhaust grooves.

A case where the magnet preloading mechanism 48 is provided in order to strengthen the bearing rigidity of the actuator has been described in the above embodiment. However, instead of the magnet preloading mechanism, a linear guide or the like may be used to structurally connect the slider and the guide together in the upward-downward direction. In this case, it becomes unnecessary to provide the slider with the air pads. Additionally, even in a case where the linear guide is used, the actuator can be used in both the atmospheric pressure environment and the vacuum environment.

The configuration of the actuator related to the one embodiment has been described above. It is to be understood by those skilled in the art that this embodiment is exemplary, that various modifications are possible for combinations of the respective constituent elements, and that such modifications are also within the scope of the invention.

According to the invention, as a guide mechanism of the actuator, the air pads, the air pads, and the magnet preloading mechanism, and the linear guide can be freely selected. Additionally, it is possible to use the actuator in both the atmospheric pressure environment and the vacuum environment.

Although a case where the gas pressure actuator is made of a non-magnetic material, particularly, ceramics has been described in the embodiment, the invention is also applicable to a gas pressure actuator made of a magnetic substance.

Although a case where the guide and the slider of the actuator have the oblong cross-sectional shape has been described in the embodiment, the invention is applicable also to an actuator including a guide and a slider having an arbitrary cross-sectional shape.

Figure 7:
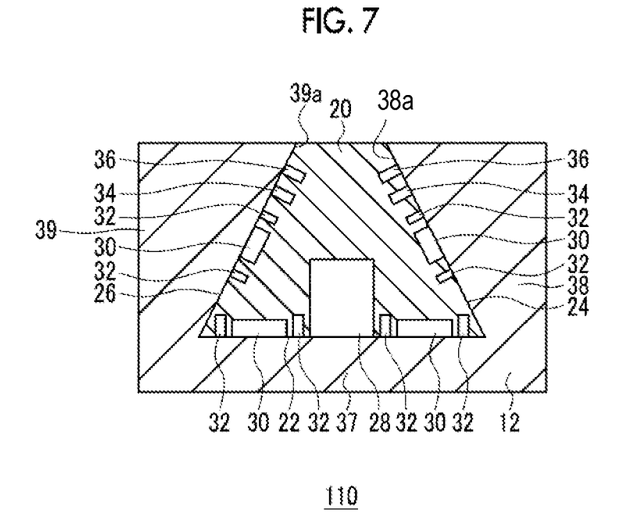
FIG. 7 is an axial sectional view of a gas pressure actuator related to still another modification example.
Figure 8:
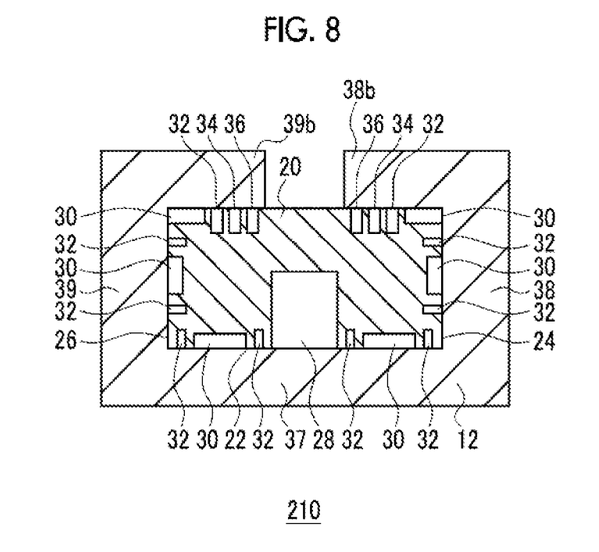
FIG. 8 is an axial sectional view of a gas pressure actuator related to still another modification example.
Figure 9:
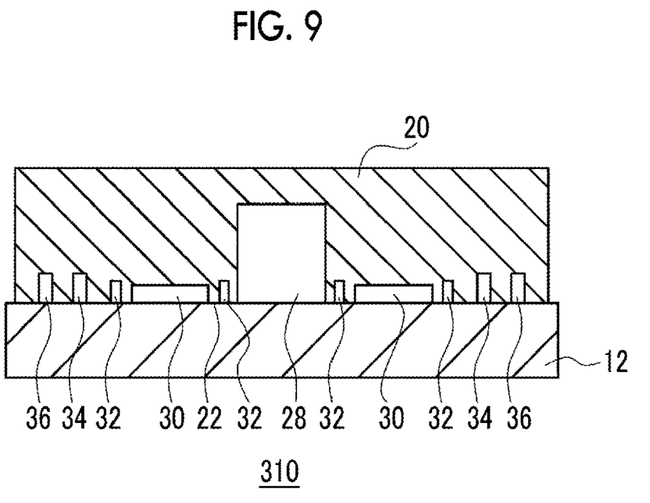
FIG. 9 is an axial sectional view of a gas pressure actuator related to still another modification example.

FIGS. 7 to 9 are axial sectional views of gas pressure actuators related to such modification examples, respectively. Each of FIGS. 7 to 9 corresponds to FIG. 3.

FIG. 7 is an axial sectional view of a gas pressure actuator 110 related to a modification example. The gas pressure actuator 110 includes the guide 12 and the slider 20. The slider 20 has a trapezoidal cross-sectional shape, and the first side surface 24 and the second side surface 26 are inclined so as to be closer to each other as they move upward. The guide 12 has a recessed cross-section corresponding to the slider 20. That is, the guide 12 is inclined such that an inner surface 38a of the first side wall 38 and an inner surface 39a of the second side wall 39 are closer to each other as they move upward.

According to the present modification example, the same effects as the effects exhibited by the gas pressure actuator related to the embodiment are exhibited. In addition, in the present modification example, the first side surface 24 and the second side surface 26 of the slider 20 are inclined, and the surfaces of the guide 12 that faces these side surfaces are inclined similarly. Hence, the first side surface 24 and the second side surface 26 (eventually, the slider 20) can receive the downward force from the high-pressure gas layer formed in the gap between the air pad 30 and the guide 12 by the gas ejected from the air pads 30. That is, according to the present modification example, the bearing rigidity of the gas pressure actuator is enhanced.

FIG. 8 is an axial sectional view of a gas pressure actuator 210 related to a modification example. The gas pressure actuator 210 includes the guide 12 and the slider 20. The slider 20 has an oblong cross-sectional shape, and the guide 12 has a recessed cross-sectional shape.

In the present modification example, the first side wall 38 and the second side wall 39 of the guide 12 have an L-shaped cross-section. The first side wall 38 and the second side wall 39 each have a first extending part 38b and a second extending part 39b that extend toward each other. In other words, it can be said that the guide 12 has an upper wall in addition to the bottom wall 37, the first side wall 38, and the second side wall 39 and a portion of the upper wall (central part) is open. The air pads 30 are formed at portions, which face the first extending part 38b and the second extending part 39b, on the upper surface of the slider 20.

According to the present modification example, the same effects as the effects exhibited by the gas pressure actuator related to the embodiment are exhibited. In addition, in the present modification example, the air pads 30 are formed on the upper surface of the slider 20 which faces the first extending part 38b and the second extending part 39b. Hence, the slider 20 can receive the downward force from the high-pressure gas layer formed in the gap between the air pads 30 and the guide 12 by the gas ejected from the air pads 30. That is, according to the present modification example, the bearing rigidity of the gas pressure actuator is enhanced.

FIG. 9 is an axial sectional view of a gas pressure actuator 310 related to a modification example. The gas pressure actuator 310 includes the guide 12 and the slider 20. The guide 12 and the slider 20 have a rectangular cross-sectional shape. In addition, the guide 12 and the slider 20 may have a polygonal cross-sectional shape, not limited to the rectangular cross-sectional shape. In the present modification example, the three surfaces of the guide 12 are open.

A plurality of air pads 30 are formed on a surface, which faces the guide 12, among surfaces constituting the slider 20, that is, the bottom surface 22. Additionally, the exhaust grooves 32, 34, and 36 for differential exhaust are formed on the bottom surface 22 of the slider 20 so as to surround the plurality of air pads 30.

According to the present modification example, since only the bottom surface 22 of the slider 20 is restrained, the structure of the guide 12 and the slider 20 is further simplified.

Figure 10:
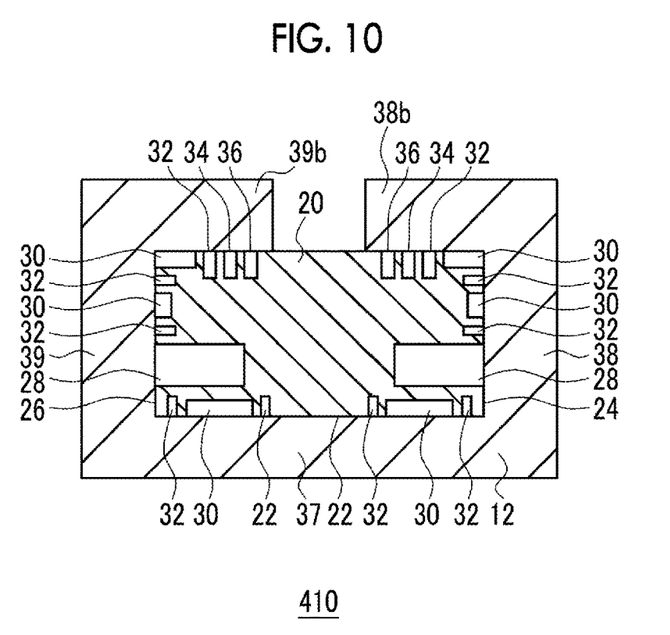
FIG. 10 is an axial sectional view of a gas pressure actuator related to still another modification example.

Although a case where the slider 20 is formed with one air servo chamber 28 has been described in the embodiment, a plurality of air servo chambers may be formed. FIG. 10 is an axial sectional view of a gas pressure actuator 410 related to such a modification example. FIG. 10 corresponds to FIG. 8. In the present modification example, air servo chambers 28 are formed in the first side surface 24 and the second side surface 26, respectively. That is, the two air servo chambers 28 are formed so as to face the inner surface 38a and the inner surface 39a that face each other with the slider 20 interposed therebetween. According to the present modification example, even if pressure fluctuation occurs in the two air servo chambers 28, a force caused by the pressure fluctuation is offset by the two air servo chambers 28. For that reason, even if pressure fluctuation occurs in the air servo chamber 28, the pressure fluctuation can be kept from influencing between the slider 20 and the guide 12.

It should be understood that the invention is not limited to the above-described embodiment, but may be modified into various forms on the basis of the spirit of the invention. Additionally, the modifications are included in the scope of the invention.

What is claimed is:

1. An actuator comprising:
   a guide that extends in one direction, at least one surface of the guide is open; and
   a slider that is movable in an axial direction with respect to the guide so as to be floated with respect to the guide and guided by the guide, the slider has an air servo chamber for driving the slider,
   wherein the slider has an air pad that is configured to eject compression gas, the slider has exhaust grooves that are configured to allow the compression gas ejected from the air pad to be discharged, and
   wherein a first one of the exhaust grooves surrounds the air pad, a second one of the exhaust grooves surrounds the first one of the exhaust grooves and a third one of the exhaust grooves surrounds the second one of the exhaust grooves.

2. The actuator according to claim 1,
   wherein the guide has a recessed cross-section, and the slider is configured to be floated with respect to the guide and guided by the guide while being restrained by three surfaces that constitute the recessed cross-section.

3. The actuator according to claim 1,
   wherein the guide has a polygonal cross-section, and the slider is configured to be floated with respect to the guide and guided by the guide while being restrained by one surface of a plurality of surfaces that constitute the polygonal cross-section.

4. The actuator according to claim 1,
   wherein a magnet preloading mechanism that applies a downward force resulting from magnetism to the slider is provided between the slider and the guide.

5. The actuator according to claim 1,
   wherein each of the exhaust grooves includes a portion that extends in the axial direction.

6. The actuator according to claim 5,
   wherein the guide has a recessed cross-section, and the slider is configured to be floated with respect to the guide and guided by the guide while being restrained by three surfaces that constitute the recessed cross-section.

7. The actuator according to claim 5,
   wherein the guide has a polygonal cross-section, and the slider is configured to be floated with respect to the guide and guided by the guide while being restrained by one surface of a plurality of surfaces that constitute the polygonal cross-section.

8. The actuator according to claim 5,
wherein a magnet preloading mechanism that applies a downward force resulting from magnetism to the slider is provided between the slider and the guide.

9. The actuator according to claim 1,
wherein either the guide or the slider has a recessed cross-section, and the slider is guided by the guide while the other of the guide and the slider is restrained by three surfaces that constitute the recessed cross-section.

10. The actuator according to claim 9,
wherein the slider has an air pad that ejects compression gas, and is configured to be floated with respect to the guide and guided by the guide.

11. The actuator according to claim 9,
wherein the slider has an air servo chamber that extends in the axial direction,
wherein the guide has a partition wall that enters the air servo chamber to partition the air servo chamber into two, and
wherein the slider supplies the compression gas to one partition of the two partitions of the air servo chamber and discharges the compression gas from the other partition, thereby moving in the axial direction with respect to the guide.

12. The actuator according to claim 9,
wherein a magnet preloading mechanism that applies a downward force resulting from magnetism to the slider is provided between the slider and the guide.

* * * * *